Figure 1:
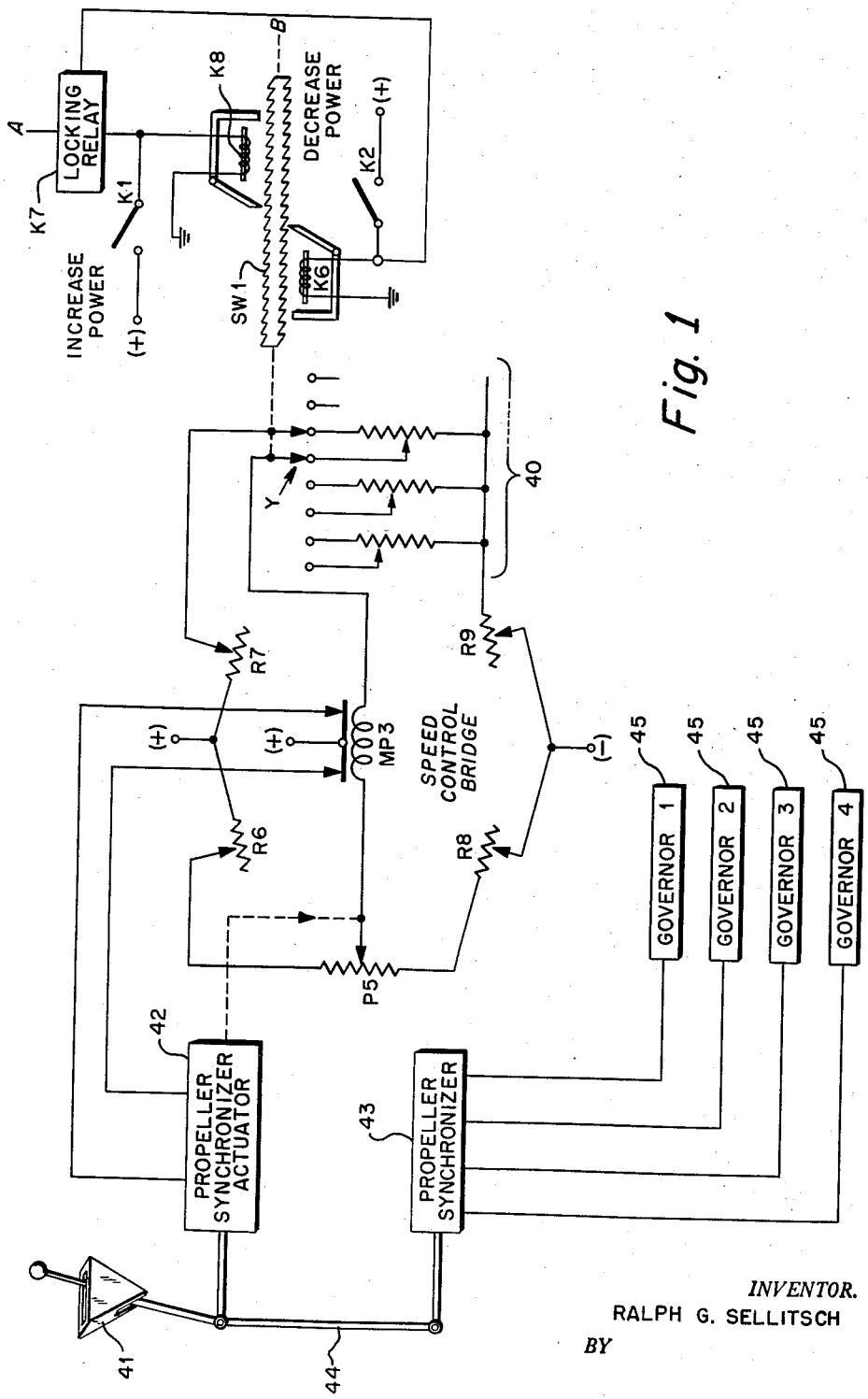

Sept. 16, 1958 R. G. SELLITSCH 2,852,214
ELECTRO MECHANICAL POWER CONTROL SYSTEM
Filed June 8, 1954 3 Sheets-Sheet 1

INVENTOR.
RALPH G. SELLITSCH
BY
H.F. Ross
ATTORNEYS

Sept. 16, 1958

R. G. SELLITSCH 2,852,214

ELECTRO MECHANICAL POWER CONTROL SYSTEM

Filed June 8, 1954

3 Sheets-Sheet 3

INVENTOR.
RALPH G. SELLITSCH

BY

H F Rose
ATTORNEYS

United States Patent Office 2,852,214
Patented Sept. 16, 1958

2,852,214

ELECTRO MECHANICAL POWER CONTROL SYSTEM

Ralph G. Sellitsch, Johnsville, Pa.

Application June 8, 1954, Serial No. 435,386

13 Claims. (Cl. 244—77)

(Granted under Title 35, U. S. Code (1952), sec. 266)

The invention described herein may be manufactured and used by or for the Government of the United States of America for governmental purposes without the payment of any royalties thereon or therefor.

The instant invention relates to a power control system applicable to single and to multi-engines and more particularly relates to a flexible power control system for aircraft having a relatively large plurality of points of positive control of various power settings and providing additional features of approach control to provide safe landing and an automatic air speed controller. The control system of the present invention will permit a pilot or operator to remotely control the power output of any type of single or multi-engined aircraft without the necessity of the ground operator being in sight of the aircraft.

Prior power control systems to perform the function of this invention had many disadvantages such as using complex electronic circuitry, necessity of remaining in sight of the controlled plane, and the fact that single engine controllers were not adaptable to multi-engine control. Controllers of the prior art devices had several inherent weaknesses in that they aligned the power schedules of manifold air pressure versus revolutions per minute by using a cam which was required to be accurately cut from a predetermined design to fit the power schedule. In addition, prior art controllers could only hold one point on the power schedule and therefore were not flexible enough and not suitable for approach controller or airspeed controller purposes.

The apparatus of the invention of this application overcomes those and other disadvantages and in addition presents a device which has simplicity of circuitry thereby allowing for economy, fewer breakdowns and greater facility of repair; and the inventive device accomplishes its function for a substantially greater range of settings and is adaptable to various types of aircraft.

Accordingly, an object of the invention is to present a flexible power control system which is self-contained and is easily attached to any type of single or multi-engined aircraft, which will require little or no structural alterations of the aircraft into which it is installed and which will retain the present pilot manual control, at the same time allowing a relatively large plurality of points of positive control of various power settings.

Another aim of the invention is to provide means for approach control for the aircraft to a safe landing.

Another purpose of the invention is to present a flexible power control system which will embody an automatic air speed controller.

Still another object of the invention of this application is to present a control system which will permit a ground or remotely stationed operator out of sight of an aircraft to remotely control the power output of any type of single or multi-engined aircraft.

Still another purpose of the invention of this application is to present apparatus which upon keying the proper radio signal will cause manifold air pressure to change to a new setting across all engines of an aircraft such that after reaching the new setting the controller will hold that setting until the remote pilot or operator makes another change; the settings being any one of a plurality of points along the manifold curve for the particular type of aircraft engine to which the signal is applied, and the manifold pressure being simultaneously altered to permit the same signal to cause the revolutions per minute to change to a corresponding point on the revolutions per minute curve so that the correct revolution per minute versus manifold air pressure relationship may be maintained throughout the power schedule.

Another object of the invention is to present a nolo and pilot controllable power control system which will have relatively simple electronic circuitry.

Another aim of the invention is to present apparatus capable of multi-engine control.

Another aim of the invention is to present a power control system which will permit alignment of a power schedule of manifold air pressure versus revolutions per minute without the necessity for cams required to be accurately cut from predetermined designs to fit the power schedule.

Still another aim of the instant invention is to present a power control system involving simplicity of circuitry, greater economy, lower incidence of breakdown, greater facility of repair and wherein the function of the invention may be accomplished for many more ranges of settings and which will be adaptable to various types of aircraft.

Another object of the invention is to present a power control apparatus dispensing with cams for operation of such a system in which electrical bridge circuits are utilized for maintaining proper manifold pressure or air speed for given propeller speeds and presenting a simplified electro-mechanical circuit and linkage whereby the system can balance several information signals fed into it.

Figure 2:
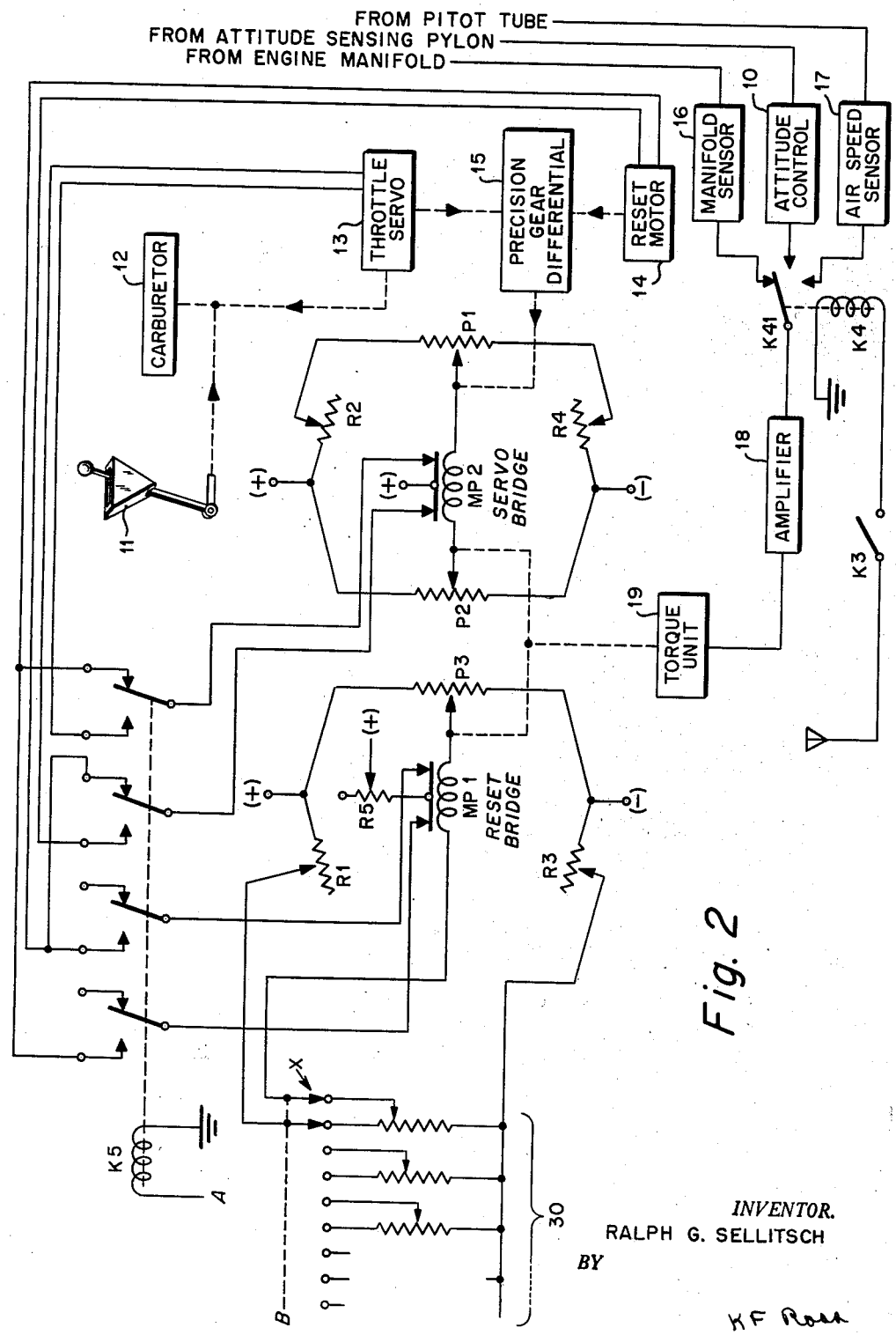
Figure 3:
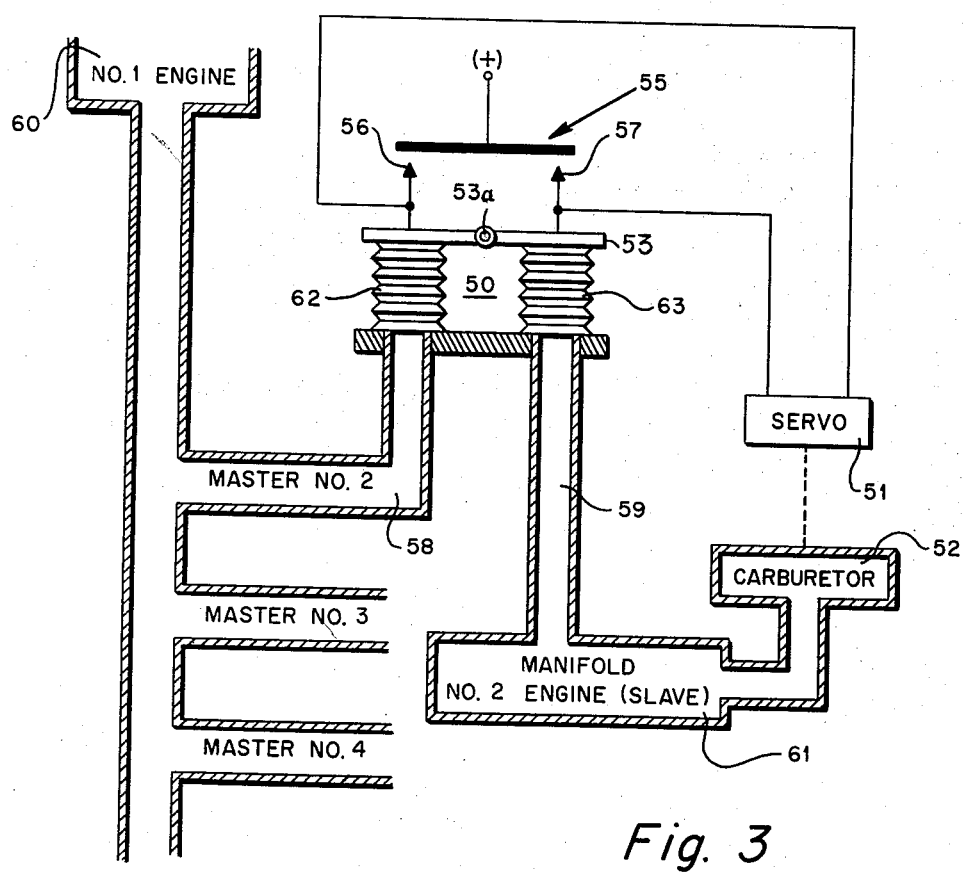

Other objects and many of the attendant advantages of this invention will be readily appreciated as the same becomes better understood by reference to the following detailed description when considered in connection with the accompanying drawings wherein:

Figs. 1 and 2 are to be taken collectively with Fig. 2 disposed to the right of Fig. 1, the figures presenting a schematic representation of the basic electrical and mechanical circuitry of an illustrative embodiment of the instant invention, and, Fig. 3 is a schematic representation of the synchronizing system of the illustrative embodiment of the invention showing the synchronization of the power function for a multiple-engined application.

Referring to the drawings and in particular to Figs. 1 and 2 a group of potentiometers 30 which may designate a group of 18 potentiometers for 18 different position settings and a second group of potentiometers 40 which may also designate a group of 18 potentiometers for 18 different position settings are linked to a bi-directional stepping switch SW1.

The individual potentiometers of the groups 30 and 40 may be preset for desired manifold air pressure and corresponding revolution per minute settings according to power schedules on the ground in calibration operations or in the air in test flight with the mere use of screwdriver adjustment of the potentiometer for correct settings for the particular aircraft in which the unit is installed. The unit may be similarly rapidly calibrated for any particular aircraft into which it is installed. An attitude control unit 10 and an airspeed sensor 17 to be described later can also be adjusted to conform to the calibrated settings of the individual potentiometers at the same time. The contact arms (not numbered) of the stepping switch SW1 upon being actuated will align themselves on one end and the contact arm of respective potentiometers of the group 30 and group 40 groups of potentiometers, as, for example, position number 7 (not numbered) on group of potentiometers 30 and position number 7 (not numbered) on group of potentiometers 40. Similarly in a different position the contact arms of the stepping switch SW1 will respectively assume positions corresponding to potentiometer 8 of potentiometer group 30 and potentiometer 8 of potentiometer group 40 etc. By way of illustration Figs. 1 and 2 show the contact arms on the X and Y positions. The values of each of these variable potentiometers in the schematic representations may be set with a screw driver adjustment to align them so as to conform individual potentiometers of the group 30 with points on the manifold air pressure schedule (M. A. P.) and individual potentiometers of the group of potentiometers 40 with corresponding points on the revolutions per minute schedule (R. P. M.).

Potentiometers P3 and P2 may be of the type commercially known as "Beckman Helipots" or their equivalents because of their ability to spread the resistance out over several (5 for example) radial turns for fine control. The potentiometers P3 and P2 are mechanically linked, as for example by virtue of gearing, to a torque unit 19 which may drive them bi-directionally under the guidance of a manifold air pressure (M. A. P.) sensing unit 16.

Consequently, manifold air pressure is sensed by the manifold sensor 16, the signal being amplified in amplifier 18 and torque unit 19 then causes the contact arms of potentiometers P3 and P2 to be positioned at various corresponding resistance points on the resistance portion of potentiometers P3 and P2. In that manner manifold air pressure is translated into values of resistance. Thereafter, a balance may be established across the reset bridge circuit between one effective resistance of one of the potentiometers of the group of potentiometers 30 and a similar amount of resistance of reset bridge or reset potentiometer P3. Any unbalance between these resistances will cause current flow and the sensitive polarized relay MP1 to thereby become actuated. A variable resistor R5 is inserted between the positive voltage source and the micro positioning switch MP1 to control the speed of the reset motor 14.

The contact or slider arm of precision gear differential potentiometer P1 may be mechanically linked or connected to a precision gear differential 15 which may be located at the engine. The contact arm of potentiometer P1 can be driven through differential 15 by two motors, one, the throttle servo 13, and the other, a small reset motor 14. The contact arm of potentiometer P1 may be rotated clockwise or counterclockwise (that is in either direction along its resistance portion) by either motor singly and under some conditions the contact arm may remain steady even though each motor is rotating in a direction opposite to the other. The prime purpose is to repeat back to the controller the position of the throttle servo 13 and compare it with the actual manifold air pressure as is indicated at servo bridge or servo potentiometer P2. Actual comparison is made by the sensitive polarized relay MP2 in a manner to be described. Variable resistors R1, R2, R3, and R4 are used to control the spread of the potentiometer contact arms.

The R. P. M. branch comprises a single bridge circuit, the speed control bridge circuit, having the desired revolutions per minute (R. P. M.), set at the desired potentiometer of the group of potentiometers 40 compared against the setting of the speed control bridge or speed control potentiometer P5, potentiometer P5 being linked with the propeller synchronizer actuator motor 42 which in turn is linked to propeller synchronizer 43. This arrangement permits the sensitive polarized relay MP3 to compare the setting for desired R. P. M. of the selected potentiometer of the group of potentiometers 40 with the setting of potentiometer P5. The actual setting then causes the revolutions per minute (R. P. M.) to be synchronized in agreement with the setting at the corresponding potentiometer of the group of potentiometers 30.

A four pole double throw relay, reset relay K5, is provided for the following functions. Prior to selection of any power setting (with the relay center contacts in a relaxed (right) position) it deactivates the reset bridge circuit and activates the servo bridge circuit causing reset motor 14 through precision gear differential 15 to move the potentiometer slider arm of potentiometer P1 in a direction to align potentiometer P1 with potentiometer P2. This will protect the apparatus by preventing power surges which would occur upon activating relay K5 if the system were not approximately in balance. At this point the servo throttle motor or throttle servo 13 is inactive. Relay K5 becomes energized upon keying to a power setting, transfers the duties of the reset motor 14 to the reset bridge circuit and causes the reset motor 14 to actuate potentiometer P1 in a direction to create an error in the servo bridge circuit. This is opposite to the direction when the relay is in unenergized condition. Energizing reset relay K5 causes the contacts to shift thereby connecting the servo bridge circuit to the throttle servo motor 13 which upon becoming active rotates in a direction to cancel the error created by the reset motor 14 while simultaneously directly altering the power output of the engine.

Remote signals to effectuate power control functions may be keyed by radio frequency and may be introduced by at least two channels, one for increase pulses, and one for decrease pulses. When signals are keyed in for increase pulses contact K1 closes causing the pulses to be received at the stepping switch SW1 to advance the multi-power settings (18 for example) in increments of one at a time in the direction of increased power. Upon keying decrease power, contact K2 will close causing K6 at the stepping switch to move in a direction to decrease the power setting in increments of one at a time.

A pair of quadrants, manifold air pressure (M. A. P.) unit 11 and revolutions per minute (R. P. M.) unit 41 are provided for local control by a pilot stationed in the aircraft. These quadrants are standard equipment in piloted aircraft.

In addition to local control wherein action of the pilot with respect to quadrants 11 and 41 will overpower the automatic remotely controlled mechanism, these quadrants have an important function in operator controlled warm ups and pre-flight maneuvers. Shifting position of quadrant 11 prior to flight will mechanically cause throttle servo 13 to impart motion to precision differential 15, which in turn, will change the position of potentiometer P1 accordingly. Resultant unbalance between effective resistance of potentiometer P1 and P2 will cause current flow in servo bridge micro positioning relay MP2 which in relaxed shown position of the contacts of relay K5 will actuate reset motor 14 to drive the slider arm of potentiometer P1 through differential 15 in a direction to cancel the error due to difference in effective resistance of potentiometer P2 and P1. Thereby the system will remain in balance preventing excessive demands on throttle servo 13 on shifting to automatic control by keying increase power. Obviously this operation of the circuit in reset relay unenergized condition will also similarly protect the circuit in the event of changes in manifold air pressure which cause movement of the slider arm of potentiometer P2 prior to keying increase power.

*Principles of operation*

Prior to keying a power setting from a ground station or control aircraft, the following conditions are in effect: The reset bridge circuit is inactive due to the reset relay K5 being unenergized or relaxed and output current therefore cannot flow from the polarized relay MP1 because of disconnection at the contacts of the reset relay K5. In this condition the bi-directional stepping switch SW1 is not engaged with any of the plurality of potentiometers 30. The only circuit active in this condition is the servo bridge circuit. The purpose of the activity of the servo bridge circuit is to continually keep this bridge circuit in nulled out or balanced condition, and thereby prevent the throttle motor 13 from moving when a setting is keyed so that the reset circuit can dictate the direction and the amount of error to correct and overcome the time lag between engine and control.

In order to accomplish this nulling out process the contact arm of potentiometer P2 is compared with the setting of potentiometer P1 on the opposite side of the bridge. Potentiometer P2 continually follows the angular movements of the torque unit 19, the travel of torque unit 19 coinciding with the actual manifold air pressure sensed by manifold sensor 16. Any unbalance causes polarized relay MP2 to rotate the reset motor 14 in a direction to move the contact arm of potentiometer P1 through the gear differential and cancel out the error so that the values at the setting of potentiometer P2 and potentiometer P1 are identical.

This process is in effect only on engine starting and during warm ups and is never used when the aircraft is airborne. This condition permits ground personnel to check engines in a normal manner for ground test of the aircraft by divorcing M. A. P. from R. P. M.

The automatic power control system of the invention is divided into two parts. These are the manifold pressure control (M. A. P.) and the engine speed control (R. P. M.) which are correlated to seek and retain any one of a plurality of settings (for example one of 18 settings) which can be set by screwdriver adjustment to align with a power schedule from idle to full power by the following method:

*Manifold pressure.*—The desired M. A. P. setting may be remotely keyed into the controller from a control aircraft or ground station. It should be noted at this point that the resistances of potentiometers P1, P2 and P3 and the particular effective resistance of the potentiometer of potentiometers 30 selected are of such value as to correspond to values of manifold pressures. Upon selection of a desired manifold air pressure, 40 inches for example, which will be one of the 18 potentiometers that compose the group of potentiometers 30, the value of resistance preselected at the slider arm (as at X) is compared with the resistance at the slider arm of potentiometer P3. Potentiometer P3 as hereinbefore stated will be in position to register the actual M. A. P. of the engine. Current flow through sensitive polarized relay MP1 then occurs if there is unbalance in the circuit between the setting of the selected potentiometer of group of potentiometers 30 and the setting of potentiometer P3. For example suppose a desired M. A. P. of 40 inches was selected. The desired M. A. P. setting is remotely keyed into the controller from a control aircraft or ground station. Upon selecting the desired M. A. P. of 40 inches, which will correspond to one of the 18 potentiometers that compose the group 30, comparison is then made with the potentiometer P3 (set to the actual M. A. P. of the engine) by the current flow sensitive polarized relay MP1. If P3 is at 34 inches M. A. P., for example, the resulting unbalance of the reset bridge circuit will be detected by energization of sensitive relay MP1 which in energized condition of relay K5 will cause the reset motor 14 to slowly turn the position potentiometer contact arm of potentiometer P1 in a direction to create an error in the servo bridge circuit and move potentiometer P1 to a position corresponding to 32 inches; the error of 34 inches M. A. P. in setting of potentiometer P3 in comparison with setting of 32 inches on potentiometer P1 causes energization of relay MP2, the throttle servo 13 thereby having power applied to move opposite the reset motor 14 action (with limitation of control of spread potentiometers R2 and R4). This will cause the contact arm of potentiometer P1 to move up to a setting corresponding to 36 inches M. A. P. and coincidentally moves the butterfly valve of the carburetor 12. In turn the true power is advanced up to 36 inches of manifold pressure and potentiometer P2 and P3 take corresponding positions.

Although setting of potentiometers P3 and P1 are equal at this point, analyzing the setting of the selected potentiometer of the group of 18 potentiometers against the setting of potentiometer P3 at 36 inches shows that the desired setting of 40 inches has not been satisfied so that the whole process repeats itself until the setting of the selected potentiometer of the group of 18 potentiometers corresponds with the setting of potentiometer P3 which in turn corresponds with the setting of potentiometers P2 and P1 at 40 inches manifold air pressure. In this condition the reset and servo circuits are balanced. From this point until another power selection is keyed into the controller, the retain feature operates to hold the 40 inch setting. For example, if M. A. P. changes to 41 inches due to descent in altitude or for other causes, potentiometer P2 will advance to 41 inches. The sensitive relay MP2 senses this error because potentiometer P1 is at the 40 inch setting. Energizing of relay MP2 by resulting current flow causes the throttle servo 13 to reposition itself to place the setting back to 40 inches M. A. P. and cancel out the error.

*Engine speed control.*—The second phase of the device as shown in Fig. 1 of the drawings provides for engine speed control and synchronization and in conjunction with the apparatus of Fig. 2 provides a locked-in sequence with manifold pressure. Coincident with keying any M. A. P. point through contact K1, the corresponding point is also engaged in the R. P. M. schedule. This is done by virtue of the bi-directional stepping switch SW1 which may be essentially a three pole, multi-throw (18 throw) switch. Eighteen throws of one pole, for example, may handle M. A. P. and eighteen throws of one pole may take care of R. P. M. A single bridge circuit, the speed control bridge circuit senses the differences between selected R. P. M. (one of the plurality of potentiometers of the group of potentiometers 40) against the position of the variable potentiometer arm of potentiometer P5 which has its contact arm attached to the propeller synchronizer drive motor 42 by a linkage so that current sensitive polarized relay MP3 will cause the R. P. M. bridge circuit to continually balance itself so that each of the 18 positions when selected (that is, when keyed remotely) will position the propeller synchronizer to 18 respective increments of angular travel when the drive motor linkage is attached to a standard propeller synchronizer 43, which may be a Hamilton standard propeller synchronizer. The synchronizer 43 in turn adjusts the speed of all engines and keeps them synchronized. Action occurs in a similar manner to the action of the bridge circuits for M. A. P., resistors R6 and R8 as well as R7 and R9 controlling the spread. The third pole of the bi-directional stepping switch may be used for indicator lights to indicate stepping switch position or may be used as follow-up ratio to take care of ranging variations.

A complete multi-engined system may consist of one controller per engine, and one propeller R. P. M. synchronizer for engines with limited range (for example 3%) synchronization. With this arrangement M. A. P. is not dependent upon any particular engine because each engine has its own intelligence with the ability to seek and retain the remote keyed signal. Other methods as described below may include master and slave engine relationship.

An airspeed sensing unit 17 may be provided responsive to keying of a third radio channel. This channel may serve to disconnect M. A. P. sensing unit 16 from the circuit and replace it with the airspeed sensing unit or airspeed sensor 17. The whole system will then function just as it did for manifold pressure except that now the controller will adjust the engines to hold any one of a plurality of airspeeds (18 airspeeds). Approach control may be provided by setting the lower airspeed settings to agree with settings normally used to allow a slow let down of the aircraft. The ground control pilot can then reduce the airspeed of the aircraft in controlled steps until the aircraft makes a safe touch down. The (G. O. A.) ground control approach system can be used to bring the aircraft down in foggy weather.

*Operation*

Three radio channels may be keyed from a remote station. The first of these radio channels which may be for increased speed is keyed by keying contact K1. Bi-directional stepping switch relays K6 and K8 in the aircraft may be linked electrically to two sets of potentiometers, one of these sets of potentiometers 40 being located in the speed control bridge circuit and the other set of potentiometers 30 being located in the reset bridge circuit. The speed control bridge circuit and the reset bridge circuit in the absence of keying is dormant and has no voltage applied. Keying a second radio channel remotely for decrease in speed reverses the direction of the bi-directional stepping switch contact, that is, keying "decrease speed" energizes relay K6 to cause the bi-directional stepping switch contact to progress in the opposite direction to that incurred by keying "increase power" (contact K1). Reset relay K5 in the line of the bi-directional stepping switch relay becomes energized upon keying. The contacts of this relay apply power to the reset bridge circuit. A servo bridge circuit shown to the right of Fig. 2 is normally operative and power applied to a reset motor 14 keeps the bridge circuit continually in balance. Locking relay K7 keeps relay K5 energized. The servo bridge circuit may comprise a potentiometer P2, a potentiometer P1, and a pair of rheostats R2, and R4 connected with the resistance portion of these potentiometers. A micro positioning relay MP2 joins the slider contact arms of potentiometer P2 and potentiometer P1. On keying "increase power" or "decrease power," the bi-directional stepping switch relay energizes causing a 1 step movement of its contact in group of potentiometers 30. This will cause unbalance of the reset bridge circuit. The servo bridge circuit has power applied at all times as indicated and is kept in balance as follows:

Upon any unbalance between the slider arm of potentiometer P2 and the slider arm of potentiometer P1, current will flow through micro positioning relay MP2 causing its contacts to close and power to be applied. Upon closing, the contacts of micro positioning relay MP2 energizes reset motor 14 which drives the contact arm or slider arm of potentiometer P1 to a position where the servo bridge circuit is restored to balance.

Manifold sensor 16 senses pressure in the induction system of the engine. The signal from the manifold sensor may be applied through contacts K41 when relay K4 causes this contact to be in the manifold sensor position, the signal is amplified in amplifier 18 and fed to a torque unit 19 which is mechanically linked to the contact or slider arms of potentiometers P3 and P2 causing these slider arms to assume a position corresponding to the manifold pressure in the inductive system at a given instant.

Upon keying air speed sensing in a third radio channel, contact K3 will close causing control relay K4 to become energized thereby causing the contact K41 to be shifted to a position causing the amplifier 18 to be connected to the airspeed sensor 17. The airspeed sensor 17 in this case will apply a signal to the amplifier 18 which is sent to the torque unit 19 and in turn through the mechanical linkage heretofore described which will cause the slider arm of potentiometers P2 and P3 to assume a position corresponding to the information from the airspeed sensor 17. In a third position of contact K41 an attitude control unit 10 leading from the attitude sensing pylon may be switched into the system and connected to amplifier 18 thereby actuating torque unit 19 to position potentiometers P3 and P2 in accordance with the signal from the attitude control unit. Information to the airspeed sensor is conveyed from the pitot tube, information from the attitude sensing pylon is conveyed to the attitude control, and information is conveyed from the engine manifold to the manifold sensor.

As hereinbefore indicated, upon keying decrease radio channel K2 closes and upon keying increase radio channel K1 closes for decrease power or increase power respectively, thereby causing the corresponding decrease or increase power relay K6 or K8 respectively to become energized causing the bi-directional stepping switch SW1 to move the contacts to the multi-potentiometer unit 30 and contacts of unit 40 so as to cause shifting of one step or one potentiometer of these units. Reset relay K5 in the line of the increase power relay K8 by means of locking relay K7 is energized and locked-in simultaneously with energizing relay K8, the increase power relay. If desired the circuit can be arranged so that keying to either increase power relay K8 or decrease power relay K6 will energize the respective keyed relay K6 or K8 and simultaneously apply power to locking relay K7 to lock-in relay K5. Reset relay K5 upon being energized by keying K1 or K2 applies power across the reset bridge circuit, completing that circuit through the reset motor 14 and remains energized because of locking relay K7. Micro positioning relay MP1 joins the contact arm of potentiometer P3 to the contact arm connecting the bridge circuit to the selected multi-potentiometer of group of potentiometers 30 with which the stepping switch contact makes connection at the particular power setting selected by keying. Unbalance between the point of connection of the stepping switch contact of stepping switch SW1 selected for the particular setting and the position of the slider arm of potentiometer P3 will cause current to flow through micro positioning relay MP1 closing its contacts and applying voltage to the reset motor 14 which in turn will accordingly shift the slider arm of potentiometer P1. Reset relay K5 upon being energized also closes contacts leading from the contacts of the micro positioning switch MP2 in the servo bridge circuit to the throttle servo 13. Movement of the slider contact arm of potentiometer P1 will cause unbalance of the servo bridge circuit and resulting current flow occurs through micro positioning relay MP2 to thereby cause the throttle servo 13 to move the precision gear differential 15 which is mechanically linked to the slider arm of potentiometer P1 in direction to cancel out the unbalance in the servo bridge circuit. At the same time manifold pressure sensing unit or manifold sensor 16 (assume airspeed sensor and attitude control are not in the circuit at this time) is affected by motion of the throttle servo 13 which is mechanically linked to the butterfly valve of carburetor 12, and causes the slider contact arms of potentiometers P3 and P2 to shift accordingly. Action of the throttle servo 13, the reset motor 14, and the manifold pressure sensing unit 16 in conjunction with amplifier 18 and torque unit 19 in response to unbalance in the circuit in order to correct errors eventually permits the system to become aligned in accordance with the desired selected pressure which is preselected by keying the increase or decrease channels to cause a particular potentiometer in the group of potentiometers 30 to be engaged in accordance with desired setting.

The unbalance of the reset bridge circuit will cause the reset motor 14 to move in a direction to unbalance the servo bridge circuit by causing movement through precision gear differential 15 to move the slider arm of potentiometer P1. Micro position relay MP2 sensing this unbalance will cause the throttle servo 13 to move through the precision gear differential 15 in a direction to cause movement of the slider arm of potentiometer P1 so as to balance the servo bridge circuit. This throttle motion causes a power change in the engine which is sensed by the manifold sensor 16. This results in amplification of the sensing signal through amplifier 18 and action of the torque unit 19 to cause the slider arms of potentiometers P3 and P2 to advance in a manner to align with selected position or selected potentiometer of the group of potentiometers 30. The series of events continually repeats itself until the position of slider arms of the potentiometers P3, P2, and P1 are in alignment with or equal to the potentiometer position selected in the group of potentiometers 30. The precision gear differential 15 permits motion in either direction of the throttle servo 13 and motion in either direction of the reset motor 14 and the resultant motion drives the contact arm or slider arm of the potentiometer P1 a distance proportional to the resultant motion and in the proper direction. Since the reset relay K5 remains continuously energized upon keying decrease power or increase power, the system will continue to supply voltage across the reset bridge circuit and the throttle servo 13 and reset motor 14 will remain continuously in the system. Therefore, should any change occur tending to unbalance the system, the series of operations described in the preceding paragraphs will repeat themselves and the system is therefore automatically self correcting.

The bi-directional stepping switch SW1 actuated by keying radio channels to close contacts K1 and K2 is also linked to a speed control bridge circuit. Keying increase power or decrease power causes the corresponding relay K8 or K6 to move the contact arms leading to the plurality of potentiometers 40, advancing or retrogressing them one step or one potentiometer. The potentiometers 40 are connected in the speed control circuit one side of the resistance portion of each potentiometer of the group of 18 potentiometers 40 being connected to the resistance portion of a ranging rheostat R9 which has its contact arm connected to B—, a negative power supply source. A second ranging rheostat R8 has its slider arm or contact arm also connected to the B— source. As indicated one resistance end of rheostat R9 may be connected to a common resistance end of the group of potentiometers 40. One resistance end of the rheostat R8 is connected to the resistance portion of potentiometer P5, thereby completing electrical connection from a common side of the group of resistors 40 through a portion of the resistance portions of rheostats R9 and R8, the resistance portions of rheostats R9 and R8 being joined by their slider arms which may be connected together and joined to the negative voltage source, the electrical line continuing through the resistance portion of potentiometer P5. The other resistance end of the potentiometer P5 is joined to the slider arm of ranging rheostat R6. One resistance end of ranging rheostat R6 may be joined to one resistance end of ranging rheostat R7, the junction between the resistance portions of rheostat R6 and R7 being connected to a positive voltage source. The slider arm of ranging rheostat R7 is connected to the resistance end of the selected potentiometer of the group of potentiometers 40 which is opposite the common connected end of that group of potentiometers. As may also be done in the case of the stepping switch contact and slider arm of potentiometer R1 of the group of resistors 30, the slider arm of the rheostat R7 and the stepping switch contact to the slider arm of the selected potentiometer of the group of the potentiometers 40 may be mechanically linked together. A micro positioning relay MP3 may be connected at one end to the slidable contact of the stepping switch which connects with the slider arm of the selected potentiometer of the group of potentiometers 40 and the other end of relay MP3 is connected to the slidable contact arm of potentiometer P5. That is, the micro positioning relay MP3 is connected at one end to the contact slider arm of potentiometer P5 and at its other end is connected to the contact arm which selectively engages one of the slider contact arms of the group of potentiometers 40. The slider contact arm of potentiometer P5 is mechanically linked to a propeller synchronizer actuator 42 which is actuated upon closing of the contacts of the micro positioning relay MP3. The propeller synchronizing actuator 42 is mechanically linked to propeller synchronizer 43. Commercially available synchronizers such as this Hamilton Standard Propeller Synchronizer are effective for the purpose. Synchronizer 43 may be connected to each of the four propeller governors if the aircraft to be controlled has four engines. It is to be understood that the device may be used with aircraft having any number of engines and the synchronizer and other apparatus may be readily modified accordingly.

On keying radio channel for increase or decrease power causing closing of contact K1 and K2 respectively, the bi-directional stepping switch SW1 selects the proper potentiometer in the group of potentiometers 40 corresponding to the selected potentiometer of the group of potentiometers 30. The combination of potentiometers as hereinbefore explained are selected for desired power settings i. e. the first potentiometer of the group of potentiometers 30 may correspond to the first potentiometer of the group of potentiometers 40, the second potentiometer of the group of potentiometers 30 may correspond to the second potentiometer of the group of potentiometers 40, etc. The particular power setting selected may be primarily concerned with allowing for proper manifold pressure in accordance with corresponding revolutions per minute desired. With the keying of the increase or decrease power radio channel, the speed control bridge circuit has power continuously applied to it and setting the contact arm at one of the plurality of potentiometers of the group 40 may cause current flow through micro positioning relay MP3 causing this relay to become energized and close its contacts. The contacts of micro positioning relay MP3 upon being closed actuate the propeller synchronizer actuator 42 which is also linked to the slider arm of speed control potentiometer P5. Resultant motion causes the propeller synchronizer 43 to move to a unit setting simultaneously aligning potentiometer P5 with the desired revolutions per minute at the selected potentiometer of the group of potentiometers 40. Action ceases upon alignment. The synchronizer 43 adjusts all governors 45 to the unit setting thereby simultaneously causing synchronization across all engines.

Airspeed sensor 17 may be cut into the system by shifting the contact of K41 in response to remotely keying in the correct signal through keying contacts K3 to thereby impose sensing of airspeed instead of sensing of manifold pressure, when the aircraft has achieved desired altitude for the cruising function. Control by the airspeed sensor 17 will thereby insure required power in the system for the particular airspeed desired. Thereafter, keying increase or decrease power will achieve settings of required airspeed and corresponding revolutions per minute. It should be understood of course that the three position relay and contact K4 and K41 are shown by way of illustration and that many conventional ways of effecting this transfer function are within the purview of the invention. As shown, K4 and K41 would comprise a bi-directional, 3 position, single pole stepping switch.

Keying for a landing operation will close contact K3 and cause the contact K41 of relay K4 to connect attitude control unit 10 to the amplifier 18 in order that the unit 19 may position the slider contact arms of potentiometers P3 and P2 in response to attitude control. The attitude control 10 gives a sense signal corresponding to differences in pressure at the attitude sensing pylon where correct speed to keep the aircraft on an even keel during landing operation must be attained. Any tendency to pancake or to nose down will cause a signal to be sent through the attitude control unit 10 where it will be amplified in amplifier 18 to permit corrective action to be instituted in the system. Of course, relay K4 is illustrated only schematically and may consist of any conventional three position type of switch including a stepping switch of the type SW1 described above.

Referring to Fig. 3 of the drawings, there is illustrated control of number 2, 3, and 4 engines in a 4 engine application where a number 1 engine is controlled as illustrated in Figs. 1 and 2. Number 1 engine is treated as the master engine, and Fig. 3 illustrates the relation between the manifold pressure in the No. 1 engine and the manifold pressure in the No. 2 engine which is treated as a slave engine. Similar systems may be installed for No. 3 and No. 4 engines. Assuming that the correct manifold air pressure desired has been attained by a unit of the device of Fig. 1 and Fig. 2 for the No. 1 or master engine, any difference in pressure between the master or No. 1 engine manifold and the No. 2 slave engine manifold is sensed by the manifold air pressure synchronizer 50, difference in pressure causing the bellows on one side to be contracted or expanded more than the bellows in the circuit of the other engine and resulting pivotal motion of lever 53 about pivot point 53a causes power to be applied to the servo motor 51. The servo motor 51 may be mechanically linked to the butterfly valve of carburetor 52 of the No. 2 engine. Actuation of this valve by the action of servo motor 51 causes the pressure in the manifold 61 of the No. 2 or slave engine to become equal to the pressure in the manifold of the No. 1 master engine. The direction of pivotal motion around pivot point 53 due to expansion or contraction of one bellows with respect to the other will cause power to be applied to the servo engine 51 in the correct direction so that pressure equalization between the manifolds as at manifold lines 58 and 59 may take place. As hereinbefore stated similar manifold air pressure synchronizers and servo engines are installed in the manifold circuits of the master No. 3 and master No. 4 engines.

It should be understood of course that by proper switching action the power control circuits of Fig. 1 and Fig. 2 may be switched to any of the multi-engines in a multi-engine aircraft thereby permitting any one of the engines to become the master engine in the event of failure of the master engine. Transfer of the functions of the power control system may be sensed by an automatic feathering sensing system (not shown) which will sense a 20 percent power loss in the specified power setting and will cause switching action to occur thereby transferring the control function to another selected engine. It should be also understood that provision of a plurality of the devices of Figs. 1 and 2 may be provided to control separate engines or groups as an alternative to or addition to the master-slave technique illustrated.

As demonstrated in the illustrative embodiment of the invention a flexible power control system is provided which is self-contained, which may be easily attached to any type of single or multi-engine aircraft, which will require no structural alteration and retain the present pilot manual control and at the same time allow a relatively large plurality of positive controls of various power settings while permitting approach control and automatic airspeed control so that a pilot out of sight may remotely control the power output, speed and landing of any type of multi-engined aircraft. As illustrated this may be done by the inventive apparatus with the utmost simplicity of circuitry allowing for economy, relatively low incidence of breakdown and increased facility of repair and the function may be accomplished for a large range of settings and will be adaptable to various types of aircraft.

It should be noted that the apparatus provides for automatic altitude compensation in that changes in manifold air pressure due to variations in atmospheric pressure at different altitudes are sensed by the manifold sensor and the system corrected accordingly to again achieve desired manifold air pressure in accordance with selected setting. It will be readily appreciated that the foregoing description of the illustrative embodiment shown is merely by way of example and that many changes would be obvious as, for example, variation of electrical components or circuits, use of other types of differentials, linkages, actuators and synchronizers as well as variations in the functions controlled.

Obviously many modifications and variations of the present invention are possible in the light of the above teachings. It is therefore to be understood that within the scope of the appended claims the invention may be practiced otherwise than as specifically described.

What is claimed is:

1. In a multi-engine power control system an engine pressure equalizing unit comprising at least one master engine and at least one slave engine, a manifold air pressure synchronizer comprising a first bellows and a second bellows, a member pivoted between said first and second bellows and secured at each end thereof to a movable face of one of said bellows causing pivoting of said member by virtue of differences in pressure between the two bellows, a pressure line between the manifold of said master engine and said first bellows, a pressure line between the manifold of said slave engine and said second bellows, thereby permitting pressure of said master engine manifold to cause said first bellows to expand and contract corresponding to the pressure in said master engine manifold and causing said second bellows to expand and contract corresponding to the pressure of said slave engine manifold, a carburetor to regulate manifold pressure of said slave engine, a servo motor to drive said carburetor, and electrical means responsive to pivoting about said pivotal member to drive said servo in direction to actuate said carburetor to cause said slave engine manifold to have the same pressure as said master engine manifold.

2. An engine power control system for an engine in an aircraft having at least one engine comprising first means to selectively engage each of a first plurality of electrical potentiometers corresponding to desired manifold air pressure settings, second means to selectively engage a second plurality of electrical potentiometers corresponding to revolution per minute positions, mechanical means joining said first and second means providing for the manifold air pressure positions corresponding with the revolution per minute positions, respectively, electrical bridge balancing means including said first plurality of potentiometers to cause said engine to assume manifold pressure selected by said first means, and electrical bridge means including said second plurality of potentiometers to provide propeller revolutions per minute selected by said second means.

3. The device of claim 2 including a second engine and means to cause said second engine in said system to attain and maintain the identical manifold pressure as the first engine.

4. A power control system for aircraft comprising a first electrical bridge having a first adjustable resistance, a second electrical bridge having a second adjustable resistance, means responsive to a power condition for varying said adjustable resistances simultaneously, means responsive to the unbalance of said second bridge for altering said power condition, and means responsive to the unbalance of said first bridge due to deviation of said power condition for rebalancing said second bridge.

5. A power control system for aircraft comprising a first electrical bridge having a first adjustable resistance, a second electrical bridge having a second adjustable resistance, means responsive to a power condition for varying said adjustable resistances simultaneously, servo motor means responsive to the unbalance of said second bridge for altering manifold pressure in said system, and additional means including reset motor means responsive to the unbalance of said first bridge acting to unbalance said first bridge.

6. A power control system for aircraft comprising a throttle device for varying manifold pressure, a first electrical bridge having a first adjustable resistance, a second electrical bridge having second and third adjustable resistances, means responsive to a deviation in a power condition in said system for varying said first and second adjustable resistances simultaneously, differential means having an output to drive said third adjustable resistance and having two inputs, servo motor means responsive to the unbalance in said second bridge due to variation in said second adjustable resistance for both driving said throttle for altering manifold pressure in said system and for providing a first input to said differential means, and reset motor means responsive to the unbalance of said first bridge due to said deviation of said power condition for supplying the second input to said differential means in the direction of rebalancing said second bridge.

7. The power control system of claim 6 in which said servo motor input to said differential means is in the direction of unbalancing said second electrical bridge.

8. A power control system for aircraft comprising a throttle device for varying manifold pressure, a first electrical bridge having first and second adjustable resistances, a second electrical bridge having third and fourth adjustable resistances, means responsive to a deviation of a power condition for varying said second and third resistances simultaneously, thereby causing an unbalance in both of said bridges, mechanical differential means connected to drive said fourth resistance and having two inputs, means to adjust said first variable resistance causing an unbalance in said first bridge for selecting the magnitude of said power condition, reset motor means responsive to the unbalance in said first bridge due to change in selection of the magnitude of said power condition for supplying a first input to said differential means in the direction of unbalancing said second bridge, and servo motor means responsive to the unbalance of said second bridge due to action of said differential means for driving both said throttle for altering manifold pressure in said system to bring about the said selected power condition and also for providing a second input to said differential means in the direction of rebalancing said second bridge.

9. The power control system of claim 8 in which said servo motor means is also responsive to the unbalance of said second bridge caused by a deviation in the magnitude of said power condition for providing said second input to said differential means tending to unbalance said second bridge, and said reset motor means is also responsive to the unbalance in said first bridge due to said deviation in the magnitude of said power condition for supplying said first input to said differential means in the direction of rebalancing said second bridge.

10. A power control system for aircraft comprising a first electrical bridge having a first adjustable resistance indicating a first power condition and a second adjustable resistance device for selecting a value for said first power condition, means responsive to the unbalance of said first bridge for altering said first power condition to approach said value selected by said first adjustable resistance, a second electrical bridge having a third adjustable resistance indicating a second power condition and a fourth adjustable resistance device for selecting a value for said second power condition, means including a third electrical bridge responsive to the unbalance of said second bridge for altering said second power condition to approach said value selected by said fourth resistance device, and a stepping switch for joining said second and fourth adjustable resistance devices for matching respective selected first and second power conditions representing optimum power operating conditions over the operating range of said system.

11. A power control system for aircraft, comprising a first electrical bridge having a first adjustable resistance indicating a first power condition and a second adjustable resistance device for selection a value for said first power condition, means responsive to the unbalance of said first bridge for altering said first power condition to approach said value selected by said first adjustable resistance device, a second electrical bridge having a third adjustable resistance indicating a second power condition and a fourth adjustable resistance device for selecting a value for said second power condition, a third electrical bridge, means responsive to the unbalance of said second bridge due to a change in selection by said fourth resistance device causing unbalance in said third bridge, means responsive to the unbalance of said third bridge for altering said second power condition to approach said value selected by said fourth resistance device, and means joining both of said second and fourth adjustable resistance devices for matching respective selected first and second power conditions representing optimum power operating conditions over the operating range of said system.

12. A power control system for aircraft, comprising a first electrical bridge having a first adjustable resistance indicating a first power condition and a second adjustable resistance device for selecting a value for said first power condition, means responsive to the unbalance of said first bridge for altering said first power condition to approach said value selected by said first adjustable resistance device, a second electrical bridge having a third variable resistance indicating a second power condition and a fourth adjustable resistance device for selecting a value for said second power conditions, a third electrical bridge, means responsive to the unbalance in said second bridge caused by a change in selection of said fourth resistance device tending to cause unbalance in said third bridge, means responsive to the unbalance in said third bridge for both altering said second power condition to approach said value selected by said fourth resistance device and also tending to cause rebalance in said third bridge, and means joining both of said second and fourth adjustable resistance devices for matching respective selected first and second power conditions representing optimum power operating conditions over the operating range of said system.

13. The power control system of claim 12 in which said third electrical bridge is provided with fifth and sixth adjustable resistances and means joining said third and fifth resistances in simultaneous indication of said second power condition.

References Cited in the file of this patent

UNITED STATES PATENTS

| | | |
|---|---|---|
| 2,496,294 | Kellogg | Feb. 7, 1950 |
| 2,552,131 | Adams | May 8, 1951 |
| 2,556,345 | Sivitz et al. | June 12, 1951 |
| 2,612,331 | Frazier et al. | Sept. 30, 1952 |
| 2,679,365 | Sparrow | May 25, 1954 |